(12) United States Patent
Pfalzgraf

(10) Patent No.: US 6,805,402 B2
(45) Date of Patent: Oct. 19, 2004

(54) MOTOR VEHICLE ROOF WITH TWO COVERS

(75) Inventor: Manfred Pfalzgraf, Herrsching (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/813,353

(22) Filed: Mar. 21, 2001

(65) Prior Publication Data

US 2001/0033099 A1 Oct. 25, 2001

(30) Foreign Application Priority Data

Mar. 21, 2000 (DE) .......................................... 100 13 723

(51) Int. Cl.$^7$ ................................................. B60J 7/047
(52) U.S. Cl. ................................... 296/220.01; 296/217
(58) Field of Search ........................... 296/217, 220.01, 296/221–223

(56) References Cited

U.S. PATENT DOCUMENTS 4,659,140 A * 4/1987 Fuerst et al. ................. 296/223
4,911,496 A * 3/1990 Fuerst ........................ 296/222

FOREIGN PATENT DOCUMENTS

| DE | 4008145 | * | 9/1991 | ................. 296/217 |
| EP | 0 477 781 A2 | | 2/1991 | |
| EP | 0 477 781 B1 | | 9/1991 | |
| FR | 2 730 958 | | 8/1996 | |

\* cited by examiner

*Primary Examiner*—Dennis H. Pedder
(74) *Attorney, Agent, or Firm*—Nixon Peabody LLP; David S. Safran

(57) ABSTRACT

A motor vehicle roof with a roof opening in the fixed roof skin and with two successive adjustable covers for closing and partially clearing the roof opening. At least one of the covers is displaceable in the lengthwise direction of the motor vehicle into an open position and is swingable out of its closed position into a ventilator position by selectively lowering a front around the respective rear edge. The rear cover may be pushed out of its tilted ventilator position to under the closed front cover into an open position by being moved forward in its tilted position over most of its path of motion and then being lowered at its rear edge on the last section of the path of motion to essentially move completely under the front cover. Alternatively, the front cover can be moved rearward in its ventilator position to a point substantially overlying the rear cover in its ventilator position.

9 Claims, 3 Drawing Sheets

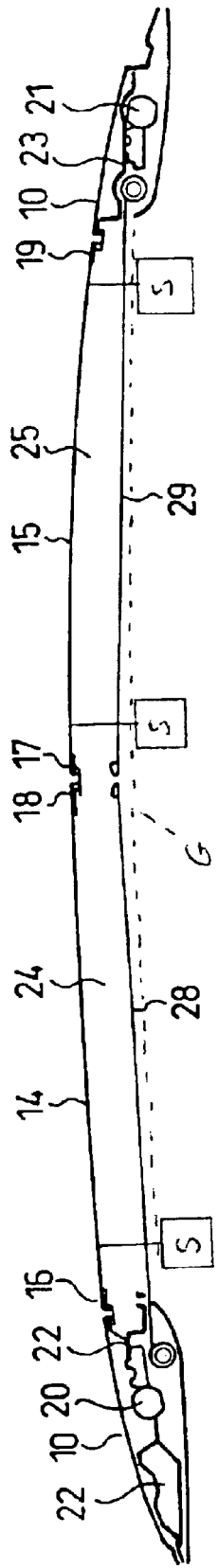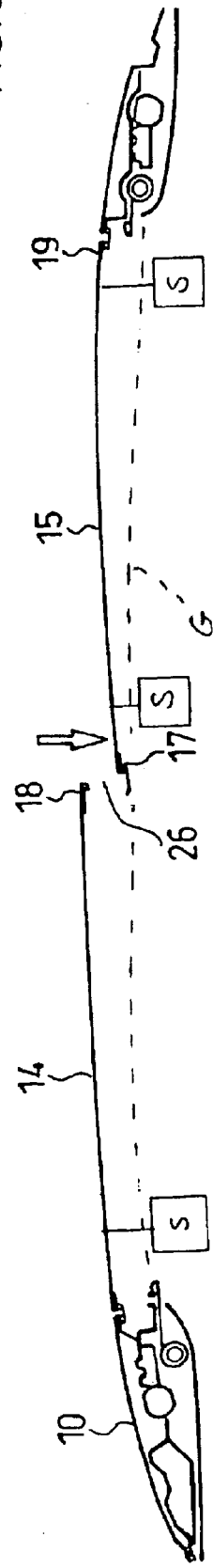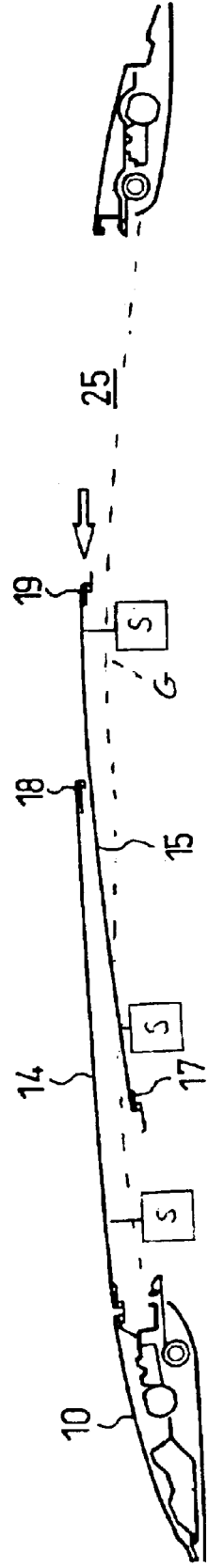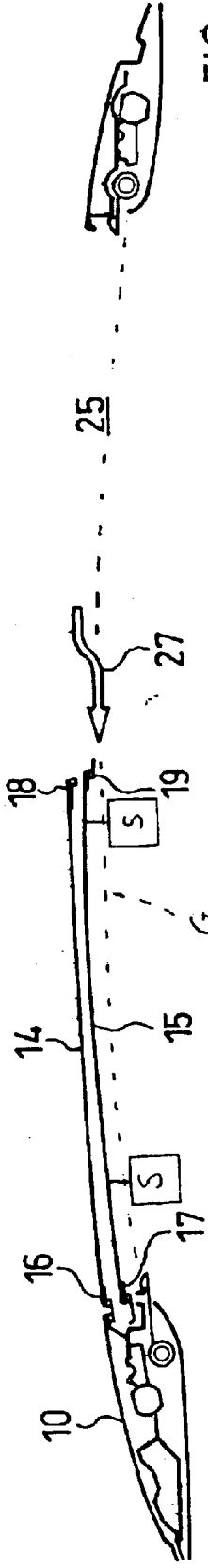

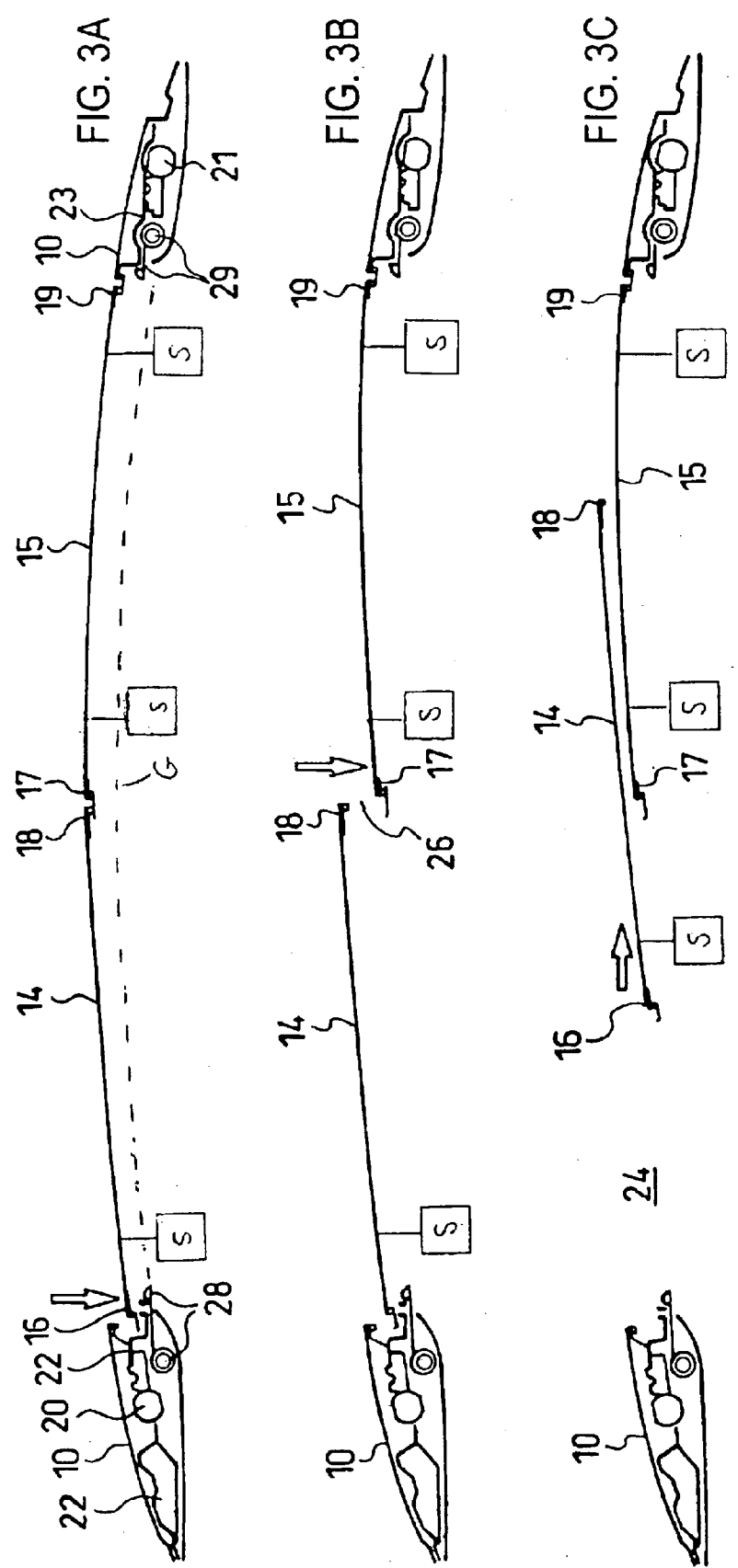

MOTOR VEHICLE ROOF WITH TWO COVERS

BACKGROUND OF THE INVENTION

1. Field of the Invention

The invention relates to a motor vehicle roof with a roof opening which is made in the fixed roof skin with two successive adjustable covers for closing and partially clearing the roof opening. At least one of the covers may be pushed the lengthwise direction of the motor vehicle into an open position and may be swiveled out of its closed position into its ventilator position.

2. Description of the Related Art

Published European Patent Application EP 0 447 781 A2 describes a sliding and lifting roof with two covers which are located side-by-side in a closed position which closes the roof opening. The front cover may be raised in the closed position with its rear edge up into the ventilator position. When the front cover is raised into the ventilator position, the adjustment means forcibly lowers the front edge of the rear cover. In the raised ventilator position of the front cover, the front cover may be shifted to the rear over the rear cover or the rear cover may be pushed under the front cover in order to clear the front or the rear section of the roof opening. When moving between the open and closed positions, the prior art motor vehicle roof is guided along a path which takes up space between the top of the passenger compartment and the roof contour so that the head space in the vehicle back is reduced. This results in a loss of usable space to passengers sitting in the passenger compartment.

SUMMARY OF THE INVENTION

The primary object of the present invention is to devise a motor vehicle roof of the initially mentioned type which may provide optimized ventilation of the motor vehicle by different cover positions and in which the head space of the back seat passengers is adversely affected as little as possible during the motion of the covers into their open positions.

The object is achieved by providing a motor vehicle roof in which the front cover and/or the rear cover may be selectively tilted around their respective rear edges so as to be lowered at their respective front edges into a ventilator position. The rear cover may be moved out of its tilted ventilator position to an open position under the closed front cover by being moved forward in its tilted position over most of its path of motion and then being lowered at its rear edge on the last section of the path of motion to essentially move under the front cover completely. This path of motion, with the rear cover in a tilted position over most of the path of motion, ensures that the rear cover and especially its rear edge, as it moves into its open position, are guided on a path which keeps it as near as possible to the roof contour so that the head space in the vehicle back essentially is not reduced. Thus, the passengers sitting in the back enjoy a more spacious vehicle interior.

Preferably, the rear cover is located essentially parallel to the front cover in its open position to keep the required stowage space small.

The object is also achieved in the initially mentioned motor vehicle roof in that the front cover and/or the rear cover may be selectively swung around their respective rear edges so as to be lowered at their respective front edges into a ventilator position and that the front cover may be pushed in its tilted ventilator position rearwards relative to the rear cover, which is likewise swiveled into its tilted ventilator position, into an open position in which it is largely located above the rear cover. While in known sliding and lifting roofs with two covers, in the open position of the front cover, the front cover is able to essentially completely cover the rear cover (above and below it) only by lowering the cover package, which also lowers the rear area of the rear cover into the usable head space. In the present vehicle roof, lowering of the rear edge of the rear cover is prevented. Thus, the free head space for the rear seat passengers is preserved, even when the front cover is opened. Moreover, an air flow is produced by the lowered front edge of the front cover while driving which counteracts the pulsing of air with the accompanying disturbing noise.

Preferably, the front cover is located essentially parallel to the rear cover in its open position so that there is a compact arrangement of the two covers.

Feasibly, the two covers are movably guided on lateral guides on the roof frame of the roof opening. The roof frame may be inserted or may be an integral part of the roof structure.

In order not to diminish the traveling comfort for the rear seat passengers, it is therefore a good idea if the rear edge of the rear cover is guided essentially at the height of the roof contour by the lateral guides over most of its path of movement into its open position.

Preferably, the covers are transparent and, especially, they are glass covers. However, sheet metal covers or the like may also be used.

In transparent covers or glass covers, it is a good idea if the vehicle roof has a covering means for the bottom of the two covers, especially at least a shade to offer protection against the sun.

BRIEF DESCRIPTION OF THE DRAWINGS

FIG. 2A is a schematic side view of a motor vehicle roof when the rear cover is closed;

FIG. 2B is a schematic side view of a motor vehicle roof when the rear cover is in its tilted or oblique ventilator position;

FIG. 2C is a schematic side view of a motor vehicle roof when the rear cover is moved toward the open position while maintaining the tilted or oblique ventilator position;

FIG. 2D is a schematic side view of a motor vehicle roof when the rear cover is opened;

FIG. 3A is a schematic side view of a motor vehicle roof when the front cover is in its tilted or oblique ventilator position;

FIG. 3B is a schematic side of a motor vehicle roof when both the front cover and the rear cover are in their respective tilted or oblique ventilator positions;

FIG. 3C is a schematic side view of a motor vehicle roof when the front cover is opening and is roughly two-thirds of the way along the rear cover.

DETAILED DESCRIPTION OF THE INVENTION

Figure 1:
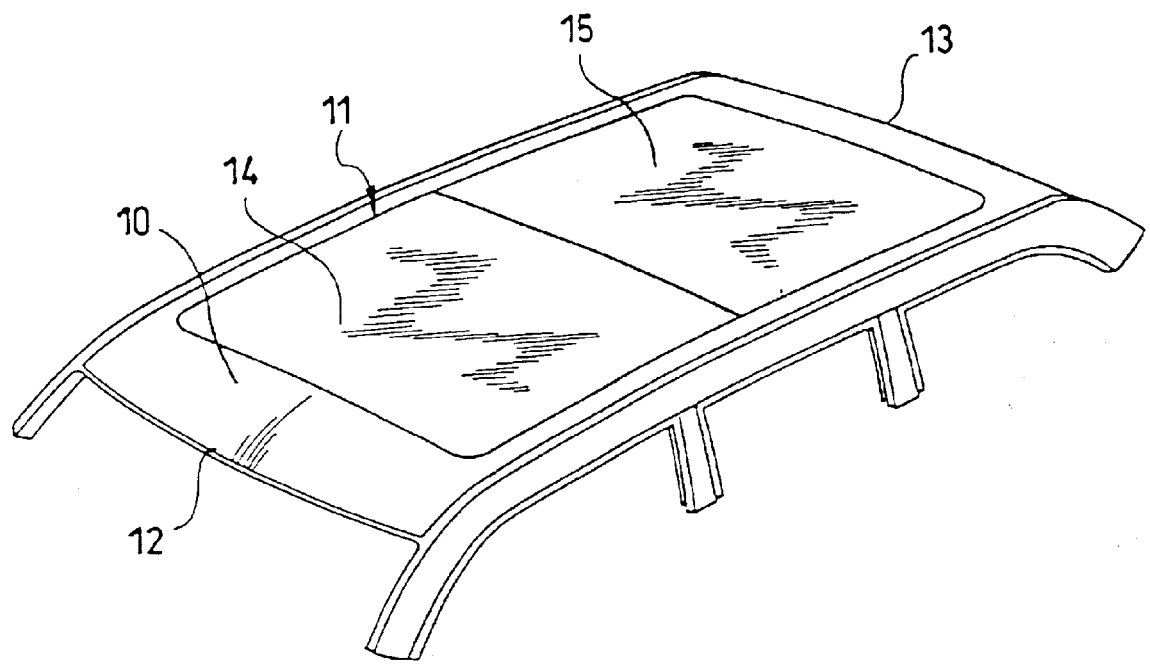
FIG. 1 is an overhead perspective view of the roof of a motor vehicle.

A motor vehicle roof (see FIG. 1), in a fixed roof skin 10, has a roof opening 11 which extends from near the front edge 12 of the roof skin 10 to near the rear edge 13 of the roof skin 10. On the bottom of the roof skin 10, a frame (not shown) is attached which, on either side of the roof opening 11, has guide rails G in which the front cover 14 and the rear cover 15 are supported to be able to move. Furthermore, the two covers 14, 15 are each provided with a swing-in mechanism S, which are only schematically represented in the drawings by which the front cover 14 and the rear cover 15 may be lowered at their front edges 16, 17 relative to the respective rear edges 18, 19 into the ventilator positions (see FIG. 2B & FIG. 3B). For their swinging motion and their displacement motion along the guide rails, the covers 14, 15 are each driven by its own drive 20, 21 which are attached to the front and rear transverse parts 22, 23 of the roof frame and which may be made in the known manner as an electric motor with a driving pinion and compressively-stiff drive cables; see, for example, U.S. Pat. No. 4,911,497 which is hereby incorporated by reference. The covers 14, 15 are preferably transparent and are especially glass covers.

In the closed position of the motor vehicle roof shown in FIG. 2A, the front cover 14 closes the front section 24 of the roof opening 11 and the rear cover 15 closes the rear section 25.

FIG. 2B shows a cover position in which the front edge 17 of the rear cover 15 has been lowered for ventilation purposes by swinging around the rear edge 19 of the cover which is held in its position, creating a ventilation opening 26 between the rear edge 18 of the front cover 14 and the front edge 17 of the rear cover 15. This ventilator position produces comparatively little air turbulence, and thus, little disturbing noise.

In order to move the rear cover 15 into its open position in which it clears the rear section 25 of the roof opening 11, the rear cover 15 is pushed forward out of its obliquely oriented or tilted ventilator position (see FIG. 2B) while this oblique position is maintained by the drive 21 (see FIG. 2C), the rear edge 19 of the rear cover 15 is moved by side cover guides G along the roof contour while the front edge 17 of the cover is moved forward with an essentially uniform distance relative to the front cover 14. When the rear edge 19 of the rear cover 15 has approached the rear edge 18 of the front cover 14 to a certain distance, the rear edge 19 of rear cover 15 is moved down by the cover guides G in a downward motion which may take place, for example, in successive steps according to the representation of the arrow 27 (see FIG. 2D), so that the rear cover 15 is aligned roughly parallel to the front cover 14. In this parallel alignment, the rear cover 15 may traverse the last section of its path of motion or displacement into its final open position under the front cover 14. This ensures that the rear cover 15, when being opened, remains largely in its upper position which is as close as possible to the roof contour so that its distance relative to a rear seat passenger remains as great as possible and the passenger's head space is restricted as little as possible. Closing motion of the rear cover 15 takes place in the opposite sequence of motions. Raising and lowering of the covers is produced by the swing-in mechanisms 5, for example, in the manner known from the above mentioned U.S. Pat. No. 4,911,497.

The opening motion of the front cover 14 is shown in FIGS. 3A to 3C. The front cover 14 is lowered via its swinging mechanism at its front edge 16 into the ventilator position (FIG. 3A), while its rear edge 18 remains on the front edge 17 of the rear cover 15 in its tight arrangement. The rear cover 15 is also lowered by means of its swinging mechanism at its front edge 17 into its ventilator position (see FIG. 3B) creating the ventilator opening 26.

To open or clear the front section 24 of the roof opening 11, the front cover 14, in its tilted or obliquely placed ventilator position, is pushed rearwards over tilted rear cover 15 so that the rear edge 18 of the front cover 14 travels roughly at the height of the roof contour, while the front edge 16 of the cover is pushed on a path which is offset downward by the ventilation height and which runs essentially parallel to the roof contour. The covering arrangement of the front cover 14 over the rear cover 15 is dependent on the tilt of the two covers 14, 15 relative to the roof contour. FIG. 3C shows a cover arrangement in which the front cover 14 covers roughly two thirds of the rear cover 15.

The control of the drives 20, 21 of the two covers 14, 15 is made such that the swinging motions of the covers 14, 15 to their ventilator positions may be executed independently of one another, but that their displacement motion may be carried out only depending on the allowable position of the respective other cover. Thus, collision of the covers 14, 15 is precluded during the displacement by the arrangement of the guide rails and by the control.

A wound, pull-out head liner or shade 28, 29 is attached, respectively at the front and rear transverse part of the roof frame or the cross member 22, 23. Each shade 28, 29 may be pulled out roughly as far as the middle of the roof opening 11 (see FIG. 2A) and thus covers the bottom of the assigned cover 14 and 15 to the desired extent. However, louver-like movable headliners may also be used.

What is claimed is:

1. A motor vehicle roof comprising:

a fixed roof skin with a roof opening therein; and front and rear displaceable covers for closing and partially clearing the roof opening;

wherein at least one of the covers is displaceable in a lengthwise direction of the motor vehicle roof into an open position and is swingable out of a closed position into a tilted ventilator position in which a respective front edge thereof is lowered around a respective rear edge;

wherein said at least one of the covers is longitudinally displaceable from said ventilator position into said open position in which said covers are vertically arranged with respect to each other, said rear edge being maintained at a constant height relative to the fixed roof skin during said longitudinal displacement at least until a last section of the longitudinal displacement.

2. The motor vehicle roof of claim 1, wherein said at least one of the covers is the rear cover which is displaceable from the tilted ventilator position to under the front cover which remains in the closed position by moving the rear cover forward with the rear edge thereof maintained substantially at the height of the fixed roof skin until the last section of the longitudinal displacement at which the rear edge of the rear cover is lowered to enable the rear cover to move completely under the front cover.

3. The motor vehicle roof of claim 1, wherein the rear cover in the open position is located essentially parallel to the front cover.

4. The motor vehicle roof of claim 1, wherein said at least one of the covers is the front cover which is displaceable rearward from the ventilator position to an open position in which the front cover is located above the rear cover to a major extent.

5. The motor vehicle roof of claim 4, wherein the front cover is located essentially parallel to the rear cover in the open position.

6. The motor vehicle roof of claim 2, wherein the two covers are movably guided on lateral guides on the roof frame of the roof opening.

7. The motor vehicle roof of claim 6, wherein the rear edge of the rear cover is guided essentially at the height of the roof contour by said lateral guides over most of the path of movement into the open position.

8. The motor vehicle roof of claim 1, wherein the covers are transparent glass covers.

9. The motor vehicle roof of claim 8, wherein the roof has a retractable sunshade covering for the underside of the two covers.

* * * * *